United States Patent [19]

Maekawa et al.

[11] Patent Number: 5,167,679
[45] Date of Patent: Dec. 1, 1992

[54] ROTARY GAS TREATING APPARATUS

[75] Inventors: Teisuke Maekawa; Sho T. Mao, both of Kobe; Kazuyuki Kawata, Otsu; Kimihiko Matsumoto, Otsu; Yasunori Kawai, Otsu, all of Japan

[73] Assignees: Taikisha Ltd., Tokyo; Toyo Boseki Kabushiki Kaisha, Osaka, both of Japan

[21] Appl. No.: 676,879

[22] Filed: Mar. 28, 1991

[30] Foreign Application Priority Data

Mar. 31, 1990 [JP] Japan .................................. 2-86646
Mar. 31, 1990 [JP] Japan .................................. 2-86647
Apr. 13, 1990 [JP] Japan .................................. 2-97940

[51] Int. Cl.⁵ .............................................. B01D 53/06
[52] U.S. Cl. ........................................ 55/208; 55/390
[58] Field of Search ........................ 55/34, 61, 77–79, 55/179–181, 388, 390, 208

[56] References Cited

U.S. PATENT DOCUMENTS

| | | | |
|---|---|---|---|
| 3,144,901 | 8/1964 | Meek | 55/390 X |
| 3,251,402 | 5/1966 | Glav | 55/390 X |
| 3,470,708 | 10/1969 | Weil et al. | 55/390 X |
| 3,780,498 | 12/1973 | Wenner | 55/73 |
| 3,828,528 | 8/1974 | Weil | 55/390 X |
| 3,889,742 | 6/1975 | Rush et al. | 55/390 X |
| 4,134,743 | 1/1979 | Macriss et al. | 55/390 X |
| 4,259,092 | 3/1981 | Matsuo et al. | 55/78 |
| 4,391,616 | 7/1983 | Imamura | 55/390 X |
| 4,398,927 | 8/1983 | Asher et al. | 55/34 |
| 4,402,717 | 9/1983 | Izumo et al. | 55/390 X |
| 4,594,860 | 6/1986 | Coellner et al. | 55/390 X |
| 4,729,774 | 3/1988 | Cohen et al. | 55/390 X |
| 4,946,479 | 8/1990 | Izumo | 55/390 X |
| 4,948,392 | 8/1990 | Rush | 55/390 X |

FOREIGN PATENT DOCUMENTS

0368435 2/1989 European Pat. Off. .
55-144526 10/1980 Japan .

OTHER PUBLICATIONS

Taikishiya, K. K., "Adsorbing And Desorbing Device," Patent Abstracts of Japan, vol. 7, No. 151 (Jul. 1983).

*Primary Examiner*—Robert Spitzer
*Attorney, Agent, or Firm*—Webb, Burden, Ziesenheim & Webb

[57] ABSTRACT

A rotary gas treating apparatus has a front-stage rotor and a rear-stage rotor each consisting essentially of an adsorbent material and allowing gas flow along a rotational axis. These rotors have, within respective rotational areas thereof, adsorbing areas for introducing a treatment-object gas and desorbing areas for introducing a recycling gas. The adsorbing area of the front-stage rotor and the adsorbing area of the rear-stage rotor are disposed in the mentioned order in a continuous treatment-object gas flow passage from an upstream side thereof. The desorbing area of the front-stage rotor and the desorbing area of the rear-stage rotor are disposed in recycling gas flow passages, respectively. With the invention, a revolving direction of the front-stage rotor and a revolving direction of the rear-stage rotor are reverse to each other. Further, the adsorbing material of the front-stage rotor has a greater average pore diameter than that forming the rear-stage rotor. And, the two rotors are driven at different revolving speeds.

22 Claims, 6 Drawing Sheets

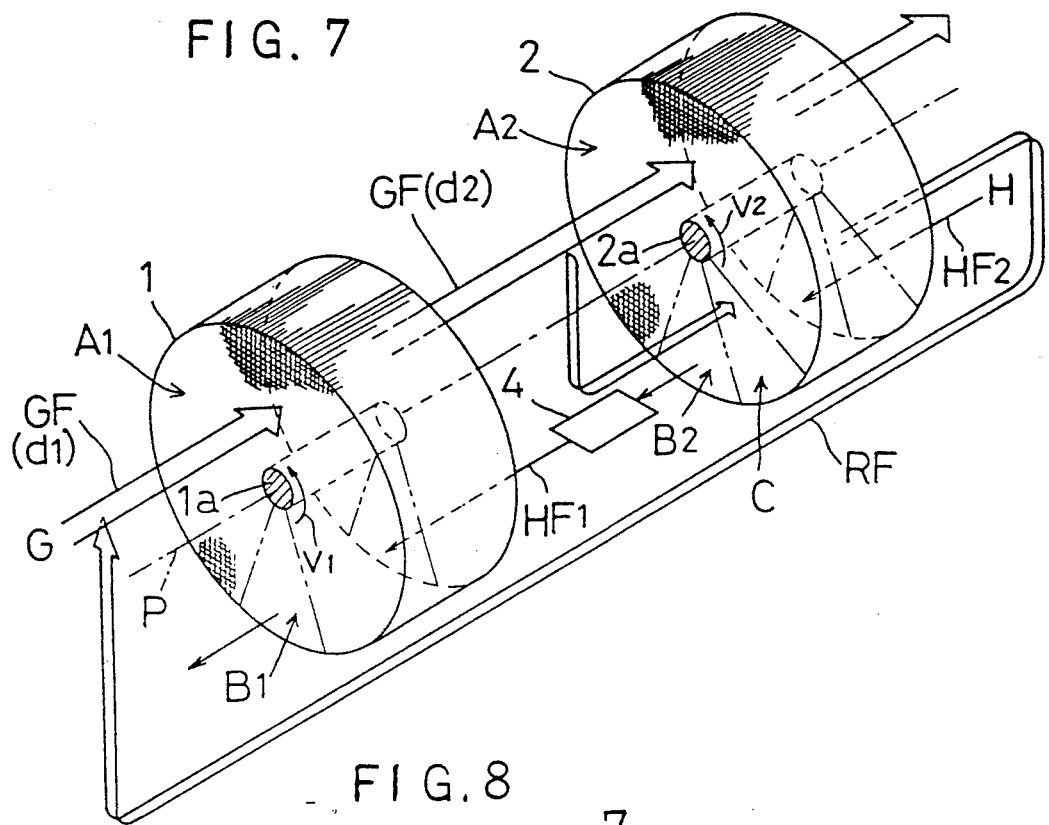
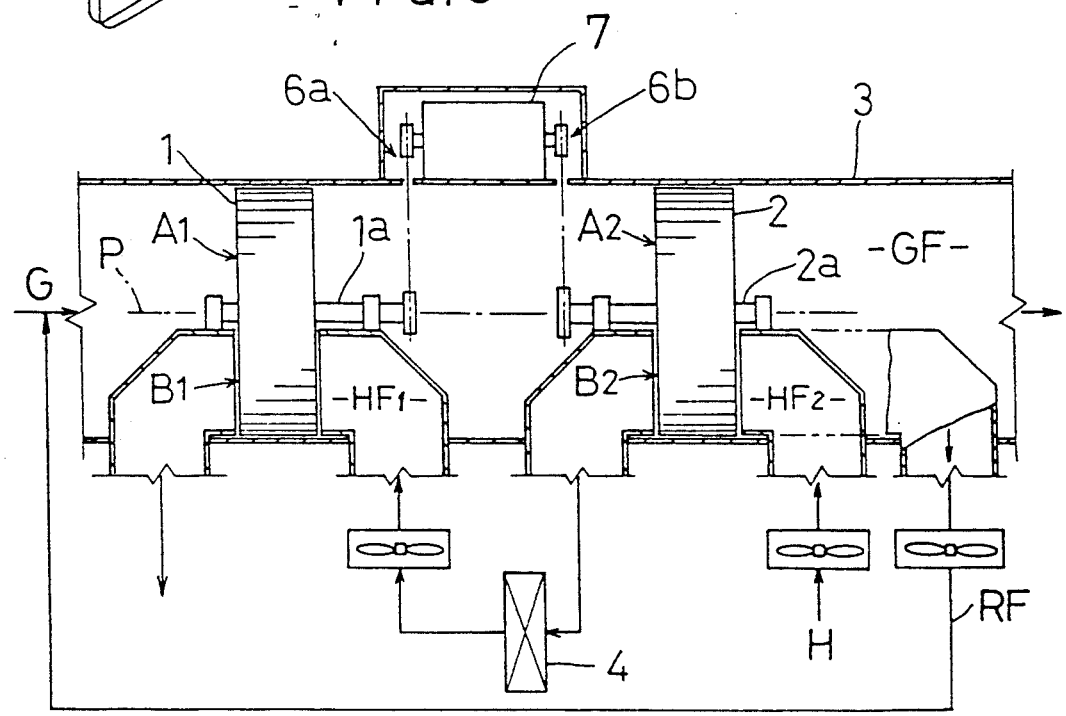

ROTARY GAS TREATING APPARATUS

BACKGROUND OF THE INVENTION

1. Field of the Invention

The present invention relates to a rotary gas treating apparatus, and more particularly to a gas treating apparatus of this type including a front-stage rotor and a rear-stage rotor each consisting essentially of an adsorbent material and allowing gas flow along a rotational axis, the rotor having, within respective rotational areas thereof, adsorbing areas for introducing a treatment-object gas and desorbing areas for introducing a recycling gas; the adsorbing area of the front-stage rotor and the adsorbing area of the rear-stage rotor being disposed in the mentioned order in a continuous treatment-object gas flow passage from an upstream side thereof; the desorbing area of the front-stage rotor and the desorbing area of the rear-stage rotor being disposed in recycling gas flow passages, respectively. In operation, the apparatus continuously treats the treatment-object gas through adsorption and desorption repeated by way of revolutions of the front-stage rotor and the rear-stage rotor through the adsorbing areas and the desorbing areas thereof.

2. Description of the Related Art

Conventionally, in a rotary gas treating apparatus of the above-described type, the front-stage rotor and the rear-stage rotor are revolved in the same direction (e.g. a Japanese laid-open utility model gazette No. 55-144526).

However, through study of adsorbing effect of the rotor on adsorbed matter to be eliminated from the treatment-object gas, the following findings have resulted. Namely, an accumulation amount of adsorbed matter in the rotor is smaller on the upstream side of the revolving direction of the rotor (to be referred to briefly as the revolving direction, hereinafter) because of a short passage time period of the matter through the adsorbing area at this upstream side. Whereas, the accumulation amount in the adsorbing area gradually increases up to a saturation point towards the downstream side of the revolving direction.

As a result, the adsorbing effect on the matter in the treatment-object gas decreases on the downstream side of the adsorbing area relative to the revolving direction.

On the other hand, as to the relationship between the front-stage rotor and the rear-stage rotor, because of the above-described, decreasing adsorbing effect on the downstream side of the adsorbing area in the revolving direction, an amount of the matter which escapes through the front-stage rotor without being adsorbed thereby gradually increases on the downstream side of the adsorbing area of this front-stage rotor. Therefore, there occurs high concentration of the matter in its distribution after the gas passage through the adsorbing area of the front-stage rotor.

Then, partly because the distance between the front-stage rotor and the rear-stage rotor is rather limited, the treatment-object gas having the above-described matter concentration distribution after its passage through the adsorbing area of the front-stage rotor tends to reach the adsorbing area of the rear-stage rotor with the gas generally maintaining the uneven matter concentration distribution.

However, with the conventional apparatus, the front-stage rotor and the rear-stage rotor are rotated in the same direction. Therefore, in the adsorbing area of the rear-stage rotor, because of the above-described revolving direction, there occurs disadvantageous matching between a direction in which the matter concentration increases because of the uneven distribution and a further direction in which the adsorbing effect of this rear-stage rotor gradually decreases because of the gradual increase in the matter accumulation amount. As a result, on the upstream side of the adsorbing area of the rear-stage rotor, there occurs insufficient utilization of the adsorbing effect because the matter concentration in the gas reaching this side is low in spite of the relatively high adsorbing capacity at this portion. On the other hand, on the downstream side of the adsorbing area of the rear-stage rotor, the treatment gas containing a great amount of the matter reaches this portion where its adsorbing capacity is relatively low. Accordingly, even if this portion has enough capacity for adsorbing the entire amount of the matter, or if the total amount does not exceed the saturation point, because the adsorbing effect is relatively decreased, a significant amount of the matter will escape through the rear-stage rotor without being trapped therein. Consequently, the treatment performance of the entire apparatus suffers.

One conceivable method to restrict the above-described deterioration in the treatment performance is to increase the thickness of each rotor in the rotational axis direction (i.e. the passage direction of the treatment-object gas). However, this invites physical enlargement of the apparatus, increases of energy consumption and of apparatus costs.

The object of the present invention is to enhance the treatment performance of the apparatus through rational improvement thereof without inviting the problems such as the enlargement of the apparatus, increases of the energy consumption and of the apparatus costs.

SUMMARY OF THE INVENTION

For accomplishing the above-noted object, a rotary gas treating apparatus, according to the present invention, comprises: a front-stage rotor and a rear-stage rotor, each rotor consisting essentially of an adsorbent material and allowing gas flow along a rotational axis, the rotors having, within respective rotational areas thereof, adsorbing areas for introducing a treatment-object gas and desorbing areas for introducing a recycling gas; the adsorbing area of the front-stage rotor and the adsorbing area of the rear-stage rotor being disposed in said order in a continuous treatment-object gas flow passage from an upstream side thereof; the desorbing area of the front-stage rotor and the desorbing area of the rear-stage rotor being disposed in recycling gas flow passages, respectively; wherein a revolving direction of the front-stage rotor and a revolving direction of the rear-stage rotor are reverse to each other. Functions and effects of this construction will be described next.

The above-described construction can be embodied as shown in FIG. 1, for instance. As shown, as the front-stage rotor 1 and the rear-stage rotor 2 are rotated in the opposite directions to each other, in the adsorbing area A2 of the rear-stage rotor 2, the direction in which the concentration of the matter of the treatment-object gas G reaching this area gradually increases because of the remains of the matter after its passage through the front-stage rotor (i.e. the direction corresponding to the revolving direction r1 of the front-stage rotor) is reverse relative to the further direction in which the adsorbing performance gradually deteriorates due to the gradual increase in the matter accumulation amount after the passage through the desorbing area B2 of this rear-stage rotor 2 (i.e. the direction corresponding to the revolving direction r2 of the rear-stage rotor 2).

Accordingly, as a general tendency, the portion of the treatment-object gas G having the high matter concentration reaches the upstream side in the revolving direction r2 of the adsorbing area A2 of the rear-stage rotor 2, at which side the adsorbing effect is relatively high. Therefore, this relatively high adsorbing effect is very efficiently utilized for adsorbing and trapping the great amount of the matter contained in the treatment-object gas G. On the other hand, on the downstream side of the adsorbing area A2 of the rear-stage rotor 2 at which side the adsorbing effect has relatively decreased, the remaining portion of the treatment-object gas G having a low matter concentration arrives. Therefore, in spite of the reduction in the adsorbing effect, because the amount of the matter contained in this gas portion is low, this small amount of the matter can be reliably adsorbed and trapped.

As the results of the functions described above, according to the construction of the present invention, with the relationship between the front-stage rotor and the rear-stage rotor, the adsorbing effect of the respective rotor can be fully utilized; thus, without increasing the thickness of each rotor in the rotational axis direction, it has become possible to reduce the amount of the matter which remains untrapped by and passes through the rotors, as compared with the conventional apparatus. Consequently, the invention has achieved the improvement of the treating performance of the rotary gas treating apparatus of this type while avoiding the problems of enlargement of the apparatus and the increases of the energy consumption and of the apparatus costs.

Incidentally, according to another conceivable method to achieve the treating performance, as shown in FIG. 3, while the front-stage rotor 1 and the rear-stage rotor 2 are rotated in the same direction r, in the revolving direction of the rotors, the disposing region of the adsorbing and desorbing areas A1 and B1 of the front-stage rotor 1 is displaced by 180 degrees relative to the disposing region of the adsorbing and desorbing areas A2 and B2 of the rear-stage rotor 2. Thus, a treatment-object gas portion G having passed an upstream portion A11 in the revolving direction r of the adsorbing area A1 of the front-stage rotor 1 and therefore having generally low matter concentration is caused to reach a downstream portion A22 in the revolving direction r of the adsorbing area A2 of the rear-stage rotor 2. On the other hand, a further treatment-object gas portion G having passed a downstream portion A12 in the revolving direction r of the adsorbing area A2 of the front-stage rotor 1 and therefore having generally high matter concentration is caused to reach an upstream portion A21 in the revolving direction r of the adsorbing area A2 of the rear-stage rotor 2.

With the above-described alternative method; however, as long as the front-stage rotor 1 and the rear-stage rotor 2 are rotated in the same direction r, in both the upstream portion A21 and the downstream portion A22 in the revolving direction r of the adsorbing area A2 of the rear-stage rotor 2, there occurs the agreement between the direction in which the matter concentration of the treatment-object gas G increases and the direction in which the adsorbing effect of the rear-stage rotor 2 per se decreases. Accordingly, for the same reasons described in connection with the first-mentioned conventional apparatus, the improvement of the treating performance of the apparatus tends to be limited. In this respect, the construction with the features of the present invention is more advantageous for the improvement of the treating performance.

According to a still further method, while the front-stage rotor and the rear-stage rotor are rotated in the same direction, there is provided a stirring device in a treatment-object gas flow passage extending between the adsorbing area of the front-stage rotor and the adsorbing area of the rear-stage rotor, so that the stirring device renders uniform, in the revolving direction, the matter concentration of the treatment-object gas reaching the adsorbing area of the rear-stage rotor. However, the alternate method requires the addition of the stirring device. Thus, the apparatus construction tends to be complicated and the apparatus costs will increase. Moreover, this apparatus can not achieve the improvement of the trapping performance due to the compensating effect utilizing the characteristics that the adsorbing effect is higher on the upstream side and lower on the downstream side of the adsorbing area of the rear-stage rotor and the tendency that the matter concentration is ununiform in the revolving direction. Therefore, in this respect too, the apparatus construction with the features of the present invention is more advantageous.

According to a further feature of the present invention, the adsorbing area of the front-stage rotor and the adsorbing area of the rear-stage rotor are disposed in substantially same rotational regions in the rotational areas of the rotors.

With this further characterizing feature, it becomes possible to reliably achieve the effect of the first features through substantially the entire regions of the adsorbing areas of the front-stage rotor and the rear-stage rotor, thus further enhancing the improvement of the treating performance.

According to a further feature of the present invention, a guide plate for restricting deflection of the treatment-object gas flow toward the revolving directions of the rotors is provided between the adsorbing area of the front-stage rotor and the adsorbing area of the rear-stage rotor in the treatment-object gas flow passage.

With this further characterizing feature, the deflection-restricting function of the guide plate prevents the matter concentration higher in the revolving direction in the treatment-object gas having passed the adsorbing area of the front-stage rotor from becoming uniform in the rotor revolving direction, such that the matter concentration higher in the revolving direction after the passage through the adsorbing area of the front-stage rotor is positively maintained until the gas reaches the adsorbing area of the rear-stage rotor. As a result, in combination with the above-described relationship between the front-stage rotor and the rear-stage rotor, the effect of the first features can be enhanced, thus achieving further improvement of the treating performance.

According to a further feature of the present invention, the fine activated carbon forming the front-stage rotor positioned on an upstream side in the treatment-object gas flow passage has an average pore diameter greater than the fine activated carbon forming the rear-stage rotor positioned on a downstream side.

That is, the fine activated carbon forming the front-stage rotor has a relatively great average pore diameter which facilitates, after the adsorbing process, desorption at the desorbing area of the desorption-resistant matter having the greater molecular diameter than the average molecular diameter of the matter to be adsorbed or the increased molecular diameter because of e.g. quality change. Accordingly, this front-stage rotor is used solely for the desorption-resistant matter contained by a relatively small amount in the treatment-object gas together with the adsorbed matter having the above-described average molecular diameter. Then, through adsorbing and desorbing actions of this front-stage rotor, the desorption-resistant matter is properly eliminated from the treatment-object gas without being accumulated on the rotor thus preventing outflow of the desorption-resistant matter to the rear-stage rotor.

On the other hand, when the front-stage rotor is provided with the relatively large average pore diameter suitable for the desorption-resistant matter, the adsorbing-trapping efficiency of this front-stage rotor for the adsorption-object matter having the above-described average molecular diameter. However, as the fine activated carbon forming the rear-stage rotor has a relatively small pore diameter suitable for the adsorption-object matter having the above-described average molecular diameter (i.e. high adsorbing effect because of relatively small gap between each pore and the adsorption-object matter entrapped thereat), this adsorption-object matter of the average molecular diameter may be efficiently eliminated from the treatment-object gas through the adsorbing-desorbing function of this rear-stage rotor.

Further, at this rear-stage rotor, since the desorption-resistant matter has been already eliminated from the treatment-object gas through the adsorbing-desorbing function of the front-stage rotor positioned on the upstream side, there occurs no accumulation of the desorption-resistant matter. Also, there occurs no interference with the adsorbing process of the adsorption-object matter of the average molecular diameter by the presence of the desorption-resistant matter, whereby the separating-trapping efficiency for the adsorption-object matter of the average molecular matter will be improved.

As the results of the functions described above, according to the further feature of the present invention, the desorption-resistant matter contained by a relatively small amount in the treatment-object gas together with the adsorption-object matter of the average molecular diameter will not be accumulated on the respective rotors without being desorbed after the adsorbing process. Thus, compared with the convention, it has become possible to extend the serviceable life of the respective rotors thereby significantly reducing the maintenance costs.

Moreover, the invention's apparatus, through its front-stage rotor, can properly effect continuous separating and trapping treatment of the desorption-resistant matter contained in the treatment-object gas which matter is merely accumulated on the rotor and can not be properly separated and trapped by the conventional apparatus. Further, as the result of the above, it has become possible also to maintain high the separating-trapping efficiency of the rear-stage rotor for the adsorption-object matter of the average molecular diameter. Consequently, the invention has achieved the treating performance and the application possibility of a rotary gas treating apparatus of this type.

According to a still further feature of the present invention, the average pore diameter of the fine activated carbon forming the front-stage rotor is more than 1.1 times greater than the average pore diameter of the fine activated carbon forming said rear-stage rotor and also the average pore diameter of the front-stage rotor is not greater than 35 Å.

With this feature, it becomes possible to achieve the effect of the first characterizing features for treating exhaust air from a spraying booth which air contains, as desorption-resistant matter, a relatively small amount of a high-boiling-point solvent, ketones which change in quality through decomposition by oxidation, polymerizing matters or the like.

More particularly, in the case of the treatment of exhaust air from a spraying booth, for efficiently adsorbing and desorbing the adsorption-object matter of the average molecular diameter, it is preferred, for the reasons set forth next, that the average pore diameter of the fine activated carbon forming the rear-stage rotor range approximately between 14 Å and 23 Å.

That is, if the average pore diameter is too small, the affinity between the activated carbon and the adsorption-object matter becomes too strong thus deteriorating the desorption effect. On the other hand, if the average pore diameter is too large, the affinity between the activated carbon and the adsorption-object matter becomes too weak thus deteriorating the adsorption effect. In either case, the treating performance will deteriorate.

Also, if the average pore diameter of the fine activated carbon forming the front-stage rotor is more than 1.1 times greater than the average pore diameter of the fine activated carbon forming the rear-stage rotor, the desorbing effect of the front-stage rotor for the desorption-resistant matter is significantly improved relative to the rear-stage rotor.

However, if the average pore diameter of the front-stage rotor exceeds 35 Å, because of the properties of the activated carbon, there occurs reduction in the specific surface area of the activated carbon, whereby there tends to occur reduction in the adsorption capacity or even in the adsorbing efficiency for the desorption-resistant matter.

Incidentally, what is referred to herein as the average pore diameter comprises a value calculated through a specific surface area and a pore volume obtained by the B.E.T. method using e.g. $N_2$ gas.

Also, in the case of a structure such as a honeycomb structure comprised of the fine activated carbon and other matters, the average pore diameter of the structure obtained through measurement of the specific surface area and the pore volume of this structure exactly agrees to the value of the average pore diameter of the fine activated carbon used for the structure.

According to a still further feature of the present invention, a revolving speed of the front-stage rotor is slower than a revolving speed of the rear-stage rotor.

With this feature, it becomes possible to extend the time period required for the adsorbing process at the adsorbing area of the front-stage rotor and the time period required for the desorbing process at the desorbing area. Thus, it becomes possible to improve the adsorption and desorption efficiencies of the front-stage rotor for the desorption-resistant matter which is low both in the adsorption efficiency and in the desorption efficiency. With this, in combination with the effects achieved by the foregoing features of the present invention where the average pore diameter of the fine activated carbon forming the front-stage rotor is greater than that of the fine activated carbon forming the rear-stage rotor, it is possible to further improve the adsorption and desorption efficiencies of the front-stage rotor not only for the adsorption-object matter having the average molecular diameter but also for the desorption-resistant matter contained by a small amount in the treatment-object gas.

According to a still further feature of the present invention, the front-stage rotor has a smaller thickness along the rotational axis than the rear-stage rotor.

The desorption-resistant matter such as a high-boiling-point solvent is readily adsorbable and therefore the width of the adsorbing area for adsorbing this matter may be relatively small. Further, in case the amount of the desorption-resistant matter is smaller than the amount of the adsorption-object matter of the average molecular diameter, there will occur no saturation of the matter in the rotor even when the rotor has a relatively small thickness. Then, based on these and other reasons, if the above additional feature of the present invention is employed, it becomes possible to reduce the amount of temperature fall in the recycling gas flowing from a recycling-gas inlet opening to a recycling-gas outlet opening at the desorbing area of the front-stage rotor, relative to the rear-stage rotor. As a result, the desorbing process at the front-stage rotor for the desorption-resistant matter which is originally difficult to be desorbed compared with the adsorption-object matter of the average molecular diameter may be promoted by maintaining the high temperature of the recycling gas due to the above-described reduction in the amount of the temperature fall. As a result, in combination with the effects achieved by the foregoing, when this additional feature is employed, it has become possible to further improve the desorbing efficiency of the front-stage rotor for the desorption-resistant matter.

Still preferably, if the front-stage rotor has a reduced thickness in the direction of the rotational axis, i.e. the passage direction of the treatment-object gas or the recycling gas, it becomes possible to reduce the pressure loss in the treatment-object gas flow passage or the recycling gas flow passage in the entire apparatus, thus conserving the energy consumption of the fan.

Still preferably, the drive mechanism can be so constructed that the front-stage rotor and the rear-stage rotor are rotated by predetermined speeds different from each other.

With this additional feature, through the differentiated revolving speeds of the two rotors, the adsorbing-object gases reaching the front-stage rotor and the rear-stage rotor have different matter concentrations. Accordingly, it becomes possible to revolve these rotors at such speeds as achieving maximum adsorption-desorption efficiency depending on the particular concentration.

As a result, while the front-stage rotor and the rear-stage rotor can achieve their maximum adsorbing-desorbing effeciencies, the entire apparatus of the present invention can achieve much higher matter separating-trapping efficiency for the treatment-object gas, as compared with the conventional apparatus of this type.

It is further conceivable to arrange the drive mechanism so that the mechanism drives the front-stage rotor and the rear-stage rotor at adjustable revolving speeds.

With this adjustable revolving speed arrangement, the apparatus can effectively cope with any change which may occur in the matter concentration in the treatment-object gas. Further and other objects, features and effects of the invention will become more apparent from the following more detailed description of the embodiments of the invention with reference to the accompanying drawings.

BRIEF DESCRIPTION OF THE DRAWINGS

FIGS. 1 and 2 illustrate an embodiment of a rotary gas treating apparatus relating to the present invention; in which, FIG. 1 is a perspective view schematically showing a construction of an apparatus of the invention, FIG. 2 is a vertical section view, FIGS. 4 and 5 illustrate a further embodiment of the present invention; in which, FIG. 4 is a perspective view schematically showing a construction of an apparatus of this embodiment, FIG. 5 is a vertical section view, FIGS. 7 and 8 show a still further embodiment of the invention; in which, FIG. 7 is a perspective view showing an apparatus of this embodiment, FIG. 8 is a vertical section view.

DESCRIPTION OF THE PREFERRED EMBODIMENTS

Figure 1:
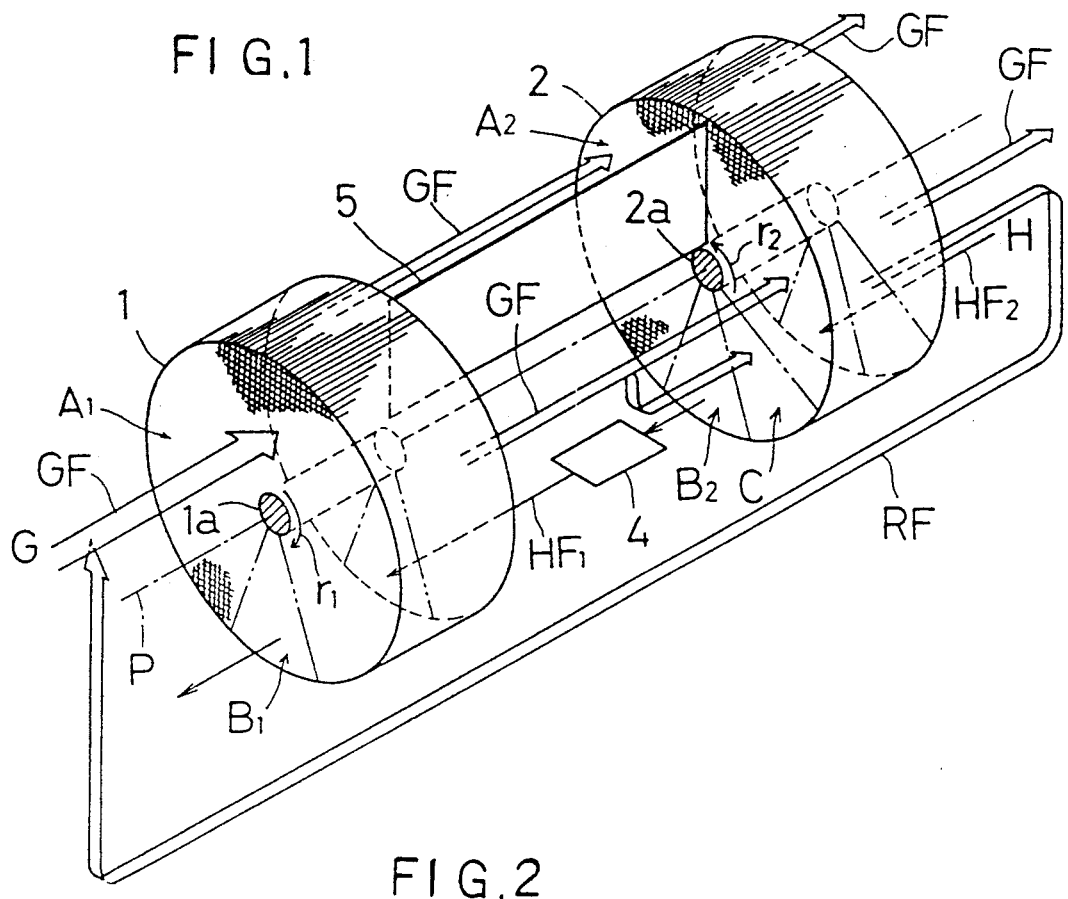
Figure 2:
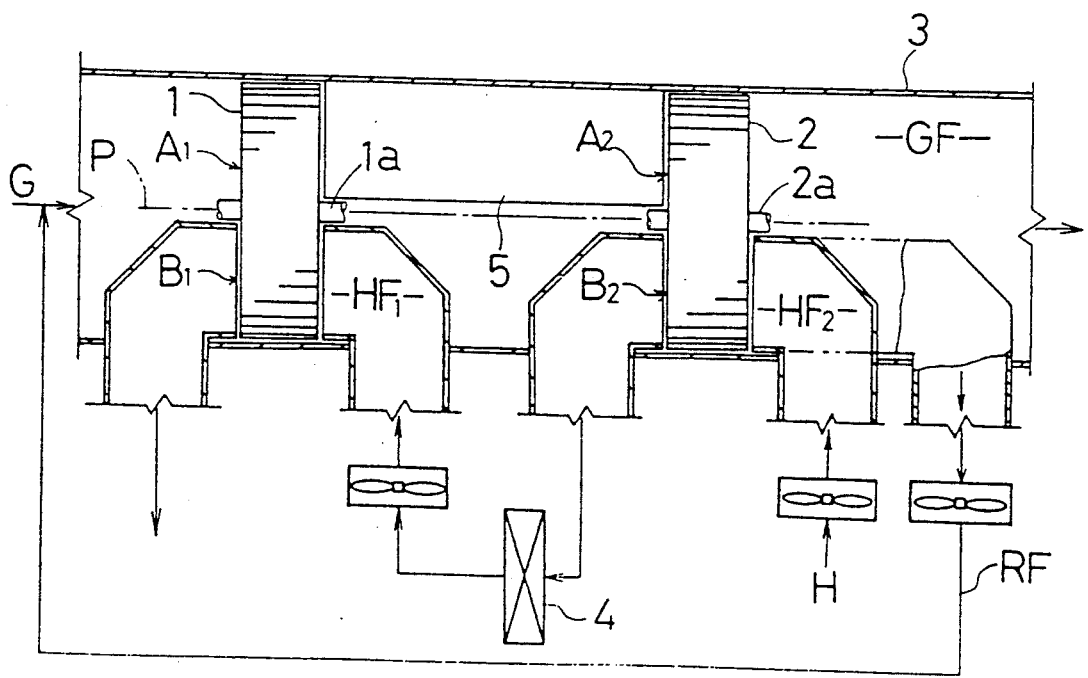
Figure 3:
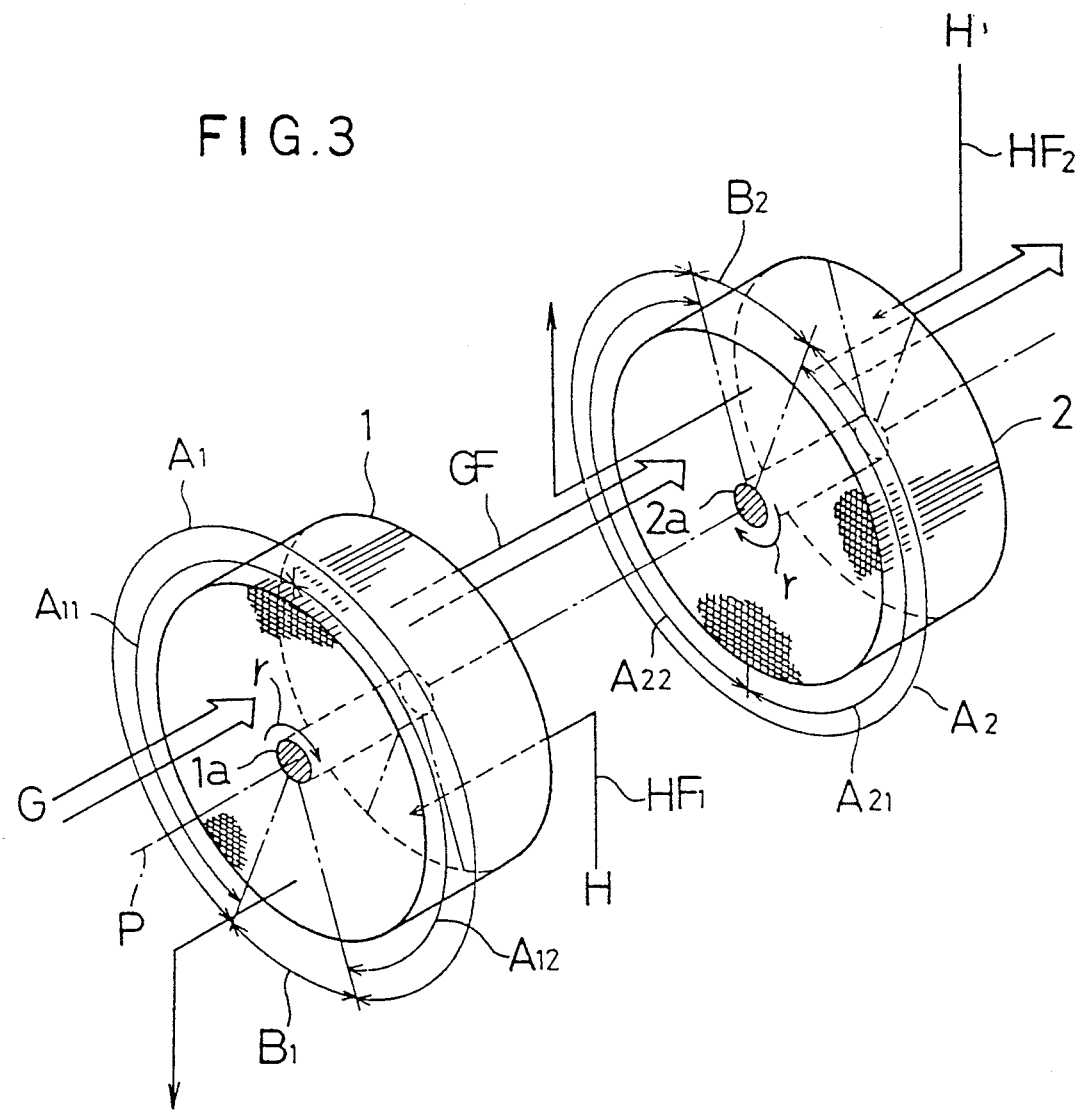
FIG. 3 is a perspective view showing a convention for comparison.

FIGS. 1 and 2 show a rotary gas treating apparatus for cleaning as a treatment-object gas exhaust air from a spraying booth by separating and trapping paint solvent component of the like contained in the exhaust gas.

The apparatus includes a pair of disc-shaped rotors 1 and 2 each formed mainly of fibrous fine activated carbon (one example of adsorbent) and having a honeycomb structure for allowing gas introduction along a rotational axis P thereof. These rotors 1 and 2 are coaxially disposed with an appropriate distance therebetween inside a casing 3.

The casing 3 forms one continuous treatment-object gas flow passage GF. In this flow passage, the treatment-object gas G is first introduced through one terminal end in the rotor disposing direction (i.e. the direction of the rotational axis P of the rotors 1 and 2); and the gas is treated as serially passing through the two rotors 1 and 2 at region portions A1, A2 of substantially the same predetermined region in the rotational areas of the respective rotors 1, 2 and then the treated gas is exhausted from the other terminal end of the flow passage.

Further, inside the casing 3, there are formed by sectioning recycling gas flow passages HF1 and HF2 for causing high-temperature recycling gas H to pass through the respective rotors 1, 2 at region portions B1, B2 of substantially the same predetermined region in the rotational areas of the respective rotors 1 and 2.

More specifically, the above-described predetermined region portions A1, A2 for passing the treatment-object gas G in the rotational areas of the respective rotors 1, 2 function as adsorbing areas. Also, the further predetermined region portions B1, B2 for passing the recycling gas H function as desorbing areas. In operation, with rotations of the two rotors 1 and 2, the adsorption-object matter (i.e. the paint solvent or the like contained in the exhaust air from the spraying booth) in the treatment-object gas G is adsorbed by the fine activated carbon forming the rotors 1, 2; and this adsorbed matter is desorbed, at the desorbing areas B1, B2, from the fine activated carbon forming the rotors 1, 2 into the high-temperature recycling gas H. And, as these adsorption and desorption are repeatedly carried out, the apparatus continuously separates and traps the paint solvent or the like from the exhaust air as the treatment-object gas G.

Incidentally, the recycling gas flow passages HF1 and HF2 for the desorbing areas B1, B2 of the respective rotors 1 and 2 are constructed as one continuous flow passage. And, between the desorbing areas B1 and B2 of the two rotors 1, 2 in this continuous flow passage of the recycling gas passages HF1 and HF2, there is interposed an intermediate heater 4 for heating the recycling gas which temperature has dropped by its passage through the upstream side desorbing area B2.

The recycling gas H having passed the two desorbing areas B1 and B2 in series is then conveyed to a burner, in which the solvent-containing desorbed matter in the recycling gas H undergoes an incineration process.

For rotating the two rotors 1 and 2, a rotary shaft 1a of the front-stage rotor 1 having its adsorbing area positioned upstream in the treatment-object gas flow passage GF and a rotary shaft 2a of the rear-stage rotor 2 having its adsorbing area positioned downstream are provided as two rotary shafts independent from each other. And, in the rotational drives of the two rotors 1 and 2, a revolving direction r1 of the front-stage rotor 1 and a revolving direction r2 of the rear-stage rotor 2 are reverse to each other.

More particularly, the concentration of the matter to be adsorbed in the treatment-object gas G after its passage through the adsorbing area A1 of the front-stage rotor 1, because of the inherent characteristics of the rotary type adsorbing-desorbing method, tends to be higher on the downstream side in the revolving direction r1 of the front-stage rotor 1; and the treatment-object gas G generally having this uneven concentration distribution tends to reach, as it is, the adsorbing area A2 of the rear-stage rotor 2. For this reason, as described above, if the front-stage rotor 1 and the rear-stage rotor 2 are rotated in the directions reverse to each other. As the result, in the adsorbing area A2 of the rear-stage rotor 2, the direction in which the concentration of the matter of the treatment-object gas G reaching this area gradually increases (i.e. the direction corresponding to the revolving direction r1 of the front-stage rotor) is reverse relative to the further direction in which the adsorbing performance of the rear-stage rotor 2 per se gradually deteriorates due to the gradual increase in the matter accumulation amount (i.e. the direction corresponding to the revolving direction r2 of the rear-stage rotor 2).

Accordingly, as a general tendency, the portion of the treatment-object gas G having the high matter concentration reaches the upstream side in the revolving direction r2 of the adsorbing area A2 of the rear-stage rotor 2, at which side the adsorbing effect is relatively high. Therefore, this relatively high adsorbing effect is very efficiently utilized for adsorbing and trapping the great amount of the matter contained in the treatment-object gas G. On the other hand, on the downstream side of the adsorbing area A2 of the rear-stage rotor 2 at which side the adsorbing effect has relatively decreased, the remaining portion of the treatment-object gas G having a low matter concentration arrives. Therefore, in spite of the reduction in the adsorbing effect, because the amount of the matter contained in this gas portion is low, this small amount of the matter can be reliably adsorbed and trapped. Consequently, on the whole, the arrangement achieves improvement of the separating-trapping performance on the matter to be adsorbed, i.e. the treating performance of the apparatus on the treatment-object gas G.

In the drawings, a reference numeral 5 denotes a guide plate for restricting deflection of the treatment-object gas G toward the revolving directions of the rotors, the guide plate being provided between the adsorbing area A1 of the front-stage rotor 1 and the adsorbing area A2 of the rear-stage rotor 2 in the treatment-object gas flow passage GF. With this, the guide plate prevents the matter concentration higher in the revolving direction in the treatment-object gas G having passed the adsorbing area A1 of the front-stage rotor 1 from becoming uniform in the rotor revolving direction, such that the matter concentration higher in the revolving direction after the passage through the adsorbing area A1 of the front-stage rotor 1 is positively maintained until the gas reaches the adsorbing area A2 of the rear-stage rotor 2. As a result, in addition to the treating performance improvement achieved by the reversed orientation of the revolving direction r1 of the front-stage rotor 1 and the revolving direction r2 of the rear-stage rotor 2, the guide plate further enhances the improvement of the treating performance.

A further embodiment of the present invention will be described next.

Figure 4:
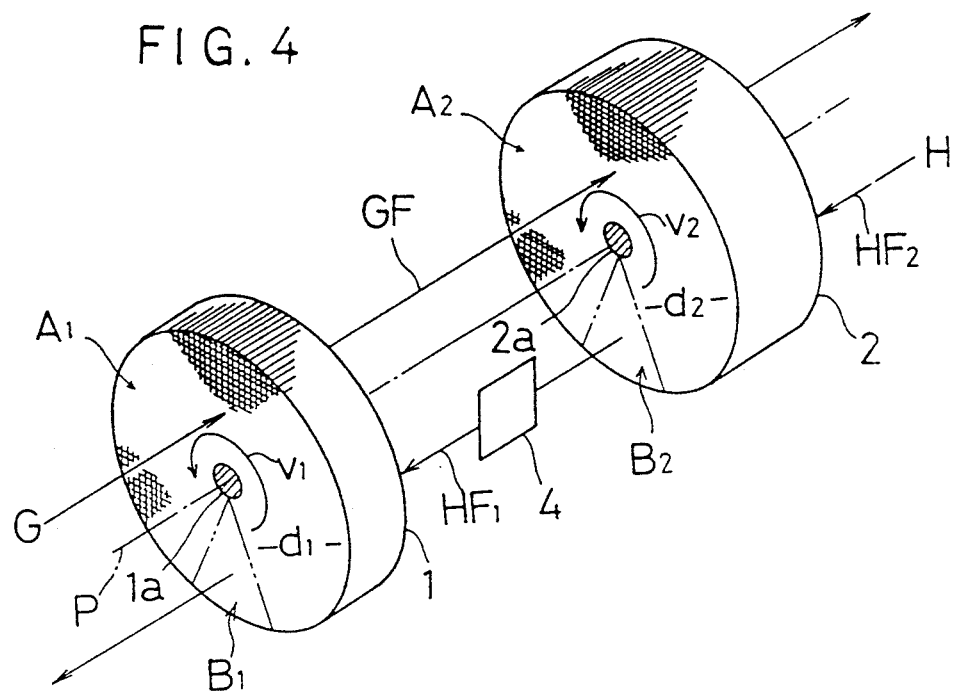
Figure 5:
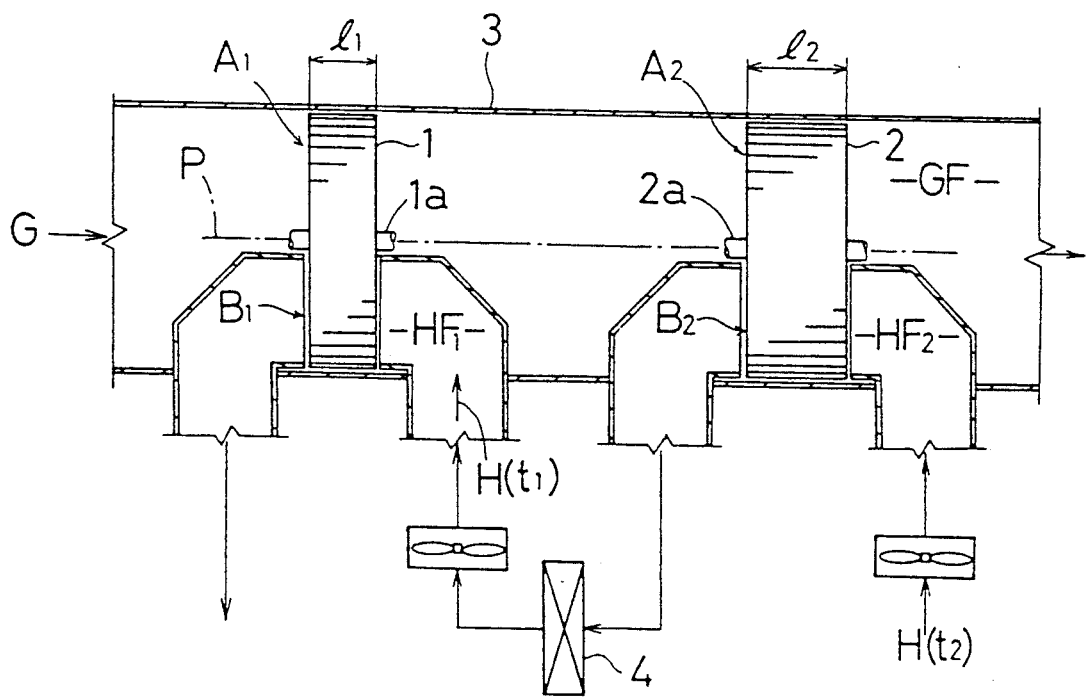

As shown in FIGS. 4 and 5, these rotors 1 and 2 are formed of a fibrous honeycomb adsorbing structure. And, the fine activated carbon forming the front-stage rotor 1 positioned on the upstream side in the treatment-object gas flow passage GF has an average pore diameter (d) greater than the fine activated carbon forming the rear-stage rotor 2 positioned on the downstream side. Specifically, in the present embodiment, the invention is used for the treatment of the exhaust gas, as the treatment-object gas G, from the spraying booth which gas contains a small amount of desorption-resistant matter (e.g. a high-boiling-point solvent, ketones which change in quality through decomposition by oxidation, polymerizing matters or the like) which is highly resistant against desorption, after the adsorbing process, because of its molecular diameter greater than an average molecular diameter of the solvent or because e.g. its molecular diameter tends to increase through quality change occurring in the course of the adsorbing and desorbing processes.

Then, the fine activated carbon used for forming the front-stage rotor 1 has an average pore diameter $d1$ ranging between 25 Å and 30 Å suitable for adsorbing and desorbing (particularly for desorbing) the above-described, desorption-resistant matter. Whereas, the fine activated carbon used for forming the rear-stage rotor 2 has an average pore diameter $d2$ ranging between 14 Å and 23 Å suitable for adsorbing and desorbing the general solvent as the main adsorption-object matter having the above-described average molecular diameter.

That is to say, with the use of the fine activated carbon having the above-described average pore diameter $d1$ for forming the front-stage rotor 1, it is possible to prevent the desorption-resistant matter, after the adsorbing process, from being accumulated on the front-stage rotor 1 without being desorbed therefrom. Accordingly, the front-stage rotor 1 alone functions for treating the desorption-resistant matter contained in the treatment-object gas G together with the main adsorption-object matter having the average molecular diameter, such that the desorption-resistant matter is properly eliminated from the treatment-object gas G through the adsorbing and desorbing processes at this front-stage rotor 1, thus preventing accumulation of the desorption-resistant matter on the rear-stage rotor 2 as well.

And, as to the adsorption-object matter (the general solvent) having the average molecular diameter which has reached the rear-stage rotor 1 without being adsorbed and trapped at the front-stage rotor 1, this matter is efficiently eliminated from the treatment-object gas G through the adsorbing and desorbing processes at the rear-stage rotor 2 formed of the fine activated carbon having the average pore diameter d2 suitable for the adsorption and desorption of the matter having the average molecular diameter. Consequently, the apparatus as the whole can efficiently separate and trap the adsorption-object matter of the average molecular diameter (the general solvent) and the desorption-resistant matter while effectively avoiding reduction in the service lives of the respective rotors 1 and 2 due to accumulation of the desorption-resistant matter thereon.

For rotating the two rotors 1 and 2, a rotary shaft 1a of the front-stage rotor 1 and a rotary shaft 2a of the rear-stage rotor 2 are provided as two rotary shafts independent from each other, so that these rotors 1 and 2 may be rotated at revolving speeds v1 and v2 different from each other. And, the revolving speed v1 of the front-stage rotor 1 is set smaller than a revolving speed v2 of the rear-stage rotor 2 (v1<v2) (practically, v1/v2 ranges between 0.3 and 0.7).

That is to say, with the setting of the revolving speeds described above, a time period required for the adsorbing process at the adsorbing area A1 and a time period required for the desorbing process at the desorbing area B1 of the front-stage rotor 1 are rendered longer than those of the rear-stage rotary member 2, respectively. With this, the front-stage rotor 1 has higher adsorbing and desorbing efficiencies for the desorption-resistant matter which is smaller in quantity and lower in adsorption efficiency than the adsorption-object matter having the average molecular diameter.

As to the constructions of the two rotors 1 and 2, the front-stage rotor 1 has a reduced thickness in the direction of the rotational axis P relative to the rear-stage rotor 2 (l1<l2) (practically, l1/l2 ranges between 0.3 and 0.7). With this arrangement, the desorbing process at the front-stage rotor for the desorption-resistant matter which is originally difficult to be desorbed compared with the adsorption-object matter of the average molecular diameter may be promoted by maintaining the high temperature of the recycling gas H due to the above-described reduction in the amount of the temperature fall in the recycling gas H flowing from an inlet opening to an outlet opening at the desorbing area B1 of the front-stage rotor 1.

Also, for further improving the desorbing efficiency at the front-stage rotor 1 for the desorption-resistant matter, in this particular embodiment, a temperature t1 of the recycling gas H to be fed to the desorbing area B1 of the front-stage rotor 1 is set higher than a temperature t2 of the recycling gas H to be fed to the desorbing area B2 of the rear-stage rotor 2 (for example, t1=150 degrees in Celsius while t2=130 degrees in Celsius).

A still further embodiment of the invention will be described next.

As shown in FIGS. 7 and 8, the drive mechanism for revolving the front-stage rotor 1 having its adsorbing area on the upstream side and the rear-stage rotor 2 having its adsorbing area on the downstream side, includes, as main components thereof, the rotary shafts 1a, 2a fixedly mounting the rotors 1, 2 respectively, a single motor 7 and transmission mechanisms 6a, 6b for transmitting the rotational force of the motor 7 to the respective rotary shafts 1a, 2a. Further, in this drive mechanism, for revolving the front-stage rotor 1 and the rear-stage rotor 2 at different predetermined revolving speeds, the rotary shaft 1a for the front-stage rotor 1 and the rotary shaft 2a for the rear-stage rotor 2 are provided independently of each other. Then, the transmission mechanisms 6a, 6b for the rotary shafts 1a, 2a are also provided independently of each other, with transmission ratios (i.e. ratio of the rotations of the driving unit and the driven unit) being different from each other.

Figure 9:
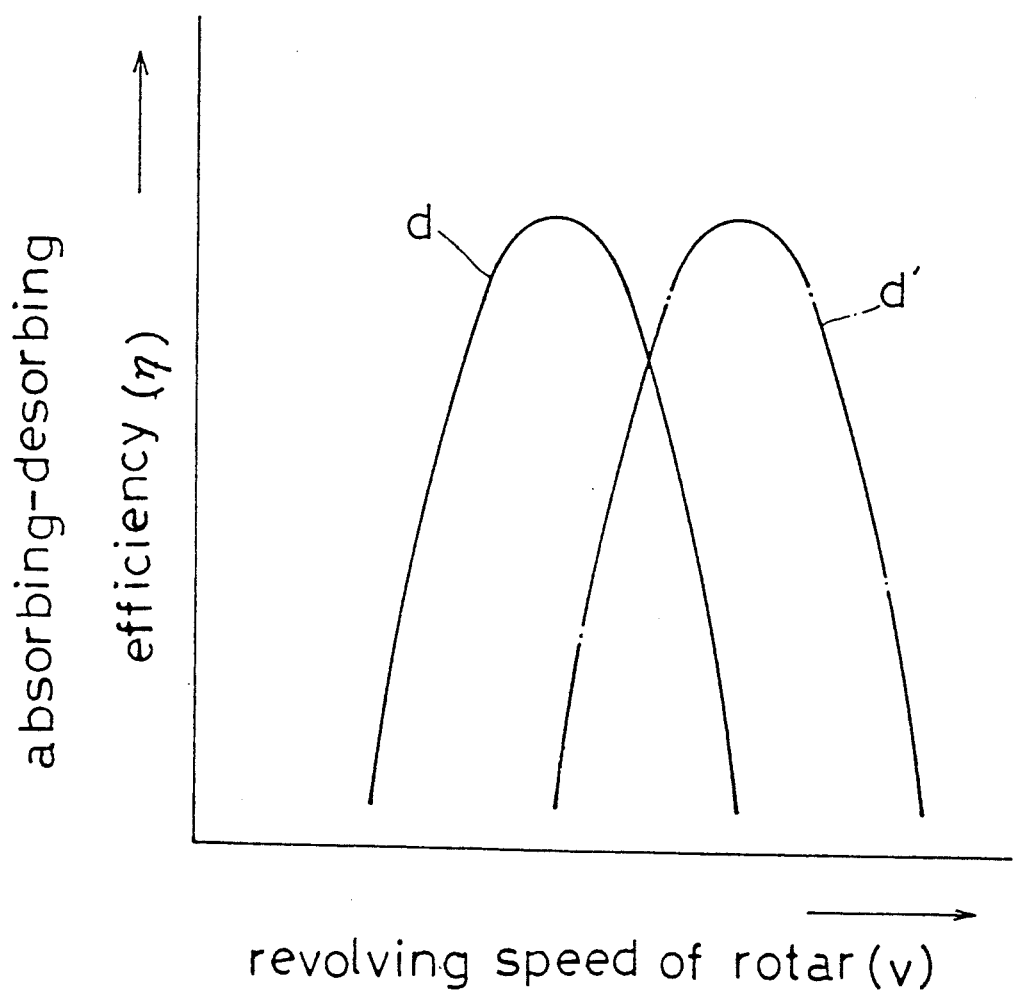
FIG. 9 is a graph showing relationship of concentration of matter to be adsorbed, revolving speed and adsorbing-desorbing efficiency.

As to the predetermined revolving speeds v1, v2 of the front-stage rotor 1 and the rear-stage rotor 2, as illustrated in FIG. 9, since the revolving speed v of the rotors 1, 2 for achieving the maximum adsorbing-desorbing efficiency ($\eta$) may vary depending on the matter concentrations d, d' of the treatment-object gas G, the predetermined revolving speed v1 of the front-stage rotor 1 is so determined as to correspond to a revolving speed where the adsorbing-desorbing efficiency ($\eta 1$) of the front-stage rotor 1 becomes maximum relative to the matter concentration d1 of the treatment-object gas G reaching the adsorbing area A1 of this front-stage rotor 1. Similarly, the predetermined revolving speed v2 of the rear-stage rotor 2 is so determined as to correspond to a revolving speed where the adsorbing-desorbing efficiency ($\eta 2$) of the rear-stage rotor 2 becomes maximum relative to the matter concentration d2 of the treatment-object gas G reaching the adsorbing area A2 of this rear-stage rotor 2. And, the revolving speed of the motor 7 and the transmission ratios of the transmission mechanisms 6a, 6b are so determined as to drive the front-stage rotor 1 and the rear-stage rotor 2 at the above-described predetermined revolving speeds v1 and v2, respectively.

That is to say, as the front-stage rotor 1 and the rear-stage rotor 2 are driven at the predetermined revolving speed v1 and v2 for achieving the respective maximum adsorbing-desorbing efficiencies ($\eta 1$), ($\eta 2$), the entire apparatus can achieve very high separating-trapping efficiency on the matter contained in the treatment-object gas G.

In the rotational area of the rear-stage rotor 2, between a terminal end of the desorbing area B2 in the revolving direction r2 of the rear-stage rotor 2 and a starting end of the adsorbing area A2, there is provided an intermediate area C communicating with a ventilation air flow passage RF. This ventilation air flow passage communicates with the treatment-object gas flow passage GF on the upstream side of the rear-stage rotor 2, but on the downstream side of the rear-stage rotor 2, the ventilation air flow passage is sectioned from both the treatment-object gas flow passage GF and the recycling air flow passage HF2. Further, the ventilation air flow passage RF has its downstream end connected with the treatment-object gas flow passage GF on the more upstream than the front-stage rotor 1.

That is to say, at the intermediate area C where the treatment-object gas G has just passed through the desorbing area B2 through the rotation of the rear-stage rotor 2, the rear-stage rotor 2 still maintains a high temperature and therefore the adsorbing effect at this area of the rotor on the matter contained in the treatment-object gas G is low, whereby some matter escapes through the intermediate area C without being adsorbed and trapped.

For this reason, the treatment-object gas G having passed through the intermediate area C is returned to the treatment-object gas flow passage GF positioned more upstream than the front-stage rotor 1, so that the gas again undergoes the separating-trapping treatment through the adsorbing area A1 of the front-stage rotor 1 and the adsorbing area A2 of the rear-stage rotor 2 subsequent thereto. Also, the rear-stage rotor 2 sufficiently cools the treatment-object gas G by its passage through the intermediate area C, so that the adsorbing area A2 subsequent to the intermediate area C can fully achieve its adsorbing effect from its starting end. Accordingly, the construction can more effectively prevent the matter from passing through the adsorbing area A2 of the rear-stage rotor 2 without being adsorbed and trapped thereby.

Some other embodiments of the present invention will be specifically described next.

(a) The number of the front-stage rotor 1 and the rear-stage rotor 2 rotated in the reverse directions is not limited to one for each. Instead, it is conceivable for the apparatus to include a plurality of either or both.

(b) The revolving speeds of the front-stage rotor and the rear-stage rotor rotated in the reverse directions may be the same or different from each other. For instance, the revolving speed of the front-stage rotor can be set at 2 rpm, while setting the revolving speed of the rear-stage rotor 2 at 4 rpm.

(c) The guide plate 5 of the foregoing embodiment may be provided in a plurality in the rotor rotational directions. Or, the guide plate 5 may be eliminated entirely.

(d) In the rotational areas of the front-stage rotor 1 and the rear-stage rotor 2 respectively, the adsorbing areas A1 and A2 may be arranged on the substantially same region portions, or may be arranged on different region portions.

(e) The intermediate area C and the ventilation air flow passage RF can be eliminated.

(f) It is also conceivable to provide more than three rotors with the first and second rotors being provided with the invention's relationship between the front-stage rotor and the rear-stage rotor and with the second and third rotors being also provided with the invention's relationship between the front-stage rotor and the rear-stage rotor.

(g) The application of the present invention is not limited to that for treating the exhaust air from the spraying booth, but is applicable also to treatment of other various kinds of gas.

(h) The fine activated carbon used for forming the rotary members 1 and 2 are not limited to the fiber type but may be of a particle type and so on.

(i) For constructing the rotors formed mainly of the fine activated carbon and allowing gas passage in the direction of the rotational axis P, the construction is not limited to the honeycomb type but may be any other type.

(j) It is conceivable to provide more than three rotors. In such case, it should be conveniently determined how many of the rotors should be disposed on the upstream side in the one continuous treatment-object gas flow passage GF as the front-stage rotor 1 for treating the desorption-resistant matter.

(k) Various modifications for improvement are possible for the specific construction of the one continuous treatment-object gas flow passage GF in which the adsorbing areas A1, A2 of the respective rotors 1 and 2 are serially disposed along the flow passage direction.

Figure 6:
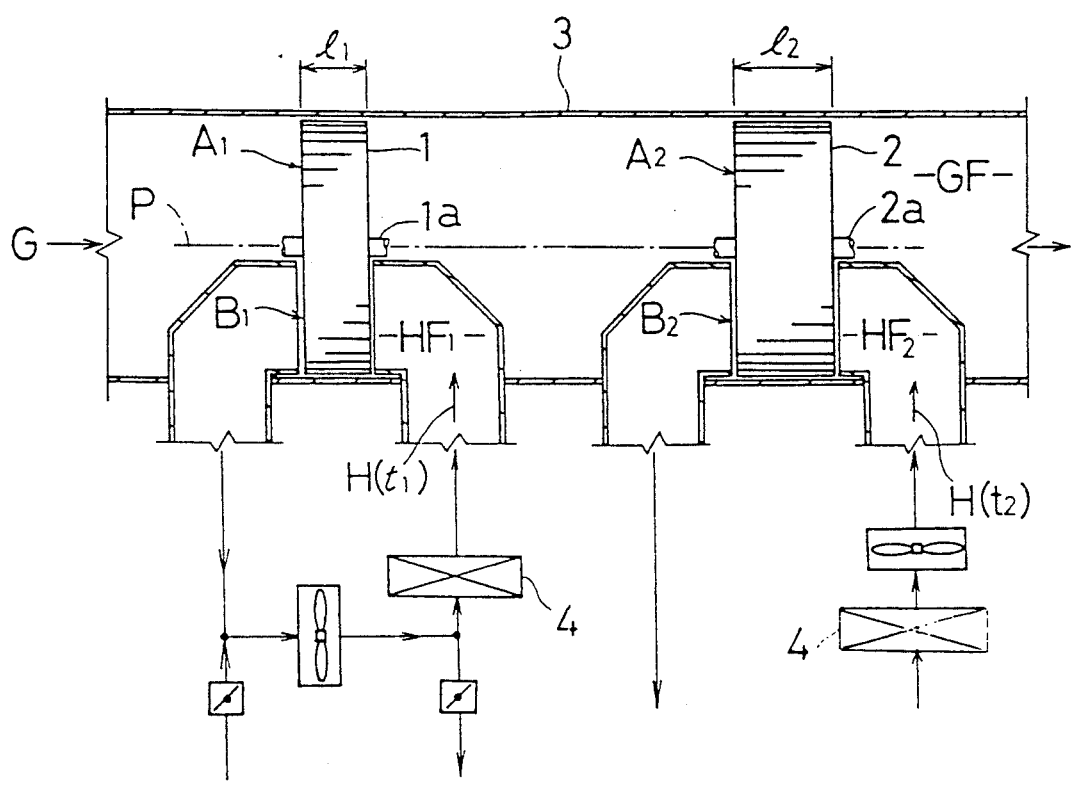
FIG. 6 is a perspective view showing a still further embodiment of the present invention.

(l) In the foregoing embodiment, the recycling gas flow passages HF1 and HF2 for allowing passage of the recycling gas H to the desorbing areas B1 and B2 of the respective rotors 1 and 2 is constructed as one continuous flow passage. Instead, as shown in FIG. 6, it is conceivable to construct these as independent flow passages. Further, the specific constructions of these recycling gas flow passages HF1 and HF2 may be modified depending on the convenience.

(m) The recycling gas H may be various kinds of gas such as air. Especially, in order to prevent increase of the desorption resistance of the desorption-resistant matter at the front-stage rotor 1 due to decomposition by oxidation, it is conceivable to employ an inert gas, such as $N_2$ gas, Ar gas, He gas or the like or a mixture gas of these, as the recycling gas H to the front-stage rotor 1 so as to improve the desorbing efficiency of the front-stage rotor 1 for the desorption-resistant matter.

(n) For promoting the desorbing effect of the front-stage rotor 1 for the desorption-resistant matter, it is conceivable to increase the feed amount of the recycling gas to the front-stage rotor 1 relative to the feed amount of the recycling gas to the rear-stage rotor 2.

(o) For rendering the average pore diameter of the fine activated carbon forming the front-stage rotor 1 greater than that of the fine activated carbon forming the rear-stage rotor 2, the specific values of the average pore diameters of the fine activated carbon forming the respective rotors 1 and 2 may be conveniently determined depending on the desorption-resistant matter and the adsorption-object matter having an average molecular diameter.

(p) The thickness 11 of the front-stage rotor 1 in the direction of the rotational axis P and the thickness 12 of the rear-stage rotor 2 in the direction of the rotational axis P may be conveniently determined depending on such factors as the adsorption and desorption efficiencies and pressure loss at the flow passages.

(q) In constructing the drive mechanism for driving the front-stage rotor 1 and the rear-stage rotor 2 at different revolving speeds, in place of the construction of the foregoing embodiment, it is further conceivable to provide separate independent motors for these rotors. In this way, the specific construction of this drive mechanism can be conveniently varied for improvement.

(r) It is conceivable for the invention's apparatus to variably adjust the revolving speed v1 of the front-stage rotor 1 and the revolving speed v2 of the rear-stage rotor 2 in accordance with variations in the matter concentrations d1 and d2 of the treatment-object gas G reaching the adsorbing areas A1, A2 of the respective rotors 1, 2. Further, it is conceivable for the apparatus to automatically effect the above variable revolving speed adjustment function by using some sensor means.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A rotary gas treating apparatus comprising:
    a front-stage rotor and a rear-stage rotor each consisting essentially of an adsorbent material and allowing passage of gas along a rotational axis, said rotors having, within respective rotational areas thereof, adsorbing areas for introducing a treatment-object gas and desorbing areas for introducing a recycling gas;
    means for revolving said front-stage rotor in a revolving direction and said rear-stage rotor in a revolving direction;
    said adsorbing area of the front-stage rotor and said adsorbing area of the rear-stage rotor being disposed in order in a continuous treatment-object gas flow passage from an upstream side thereof;
    said desorbing area of the front-stage rotor and said desorbing area of said rear-stage rotor being disposed in recycling gas flow passages, respectively;
    a guide plate means for preventing said treatment-object gas from being deflected in said revolving directions of said front-stage and said rear-stage rotor, said guide plate means interposed between said adsorbing area of said front-stage rotor and said adsorbing area of said rear-stage rotor;
    wherein said revolving direction of said front-stage rotor and said revolving direction of said rear-stage rotor being reversed to each other.

2. A rotary gas treating apparatus, as defined in claim 1, wherein said adsorbing areas are disposed in substantially same regions in the rotational areas of said front-stage rotor and said rear-stage rotor, respectively.

3. A rotary gas treating apparatus, as defined in claim 1 or 2, wherein an intermediate area is provided in the rotational area of said rear-stage rotor, said intermediate area communicating with said treatment-object gas flow passage on the upstream side of said rear-stage rotor and communicating, on the downstream side of said rear-stage rotor, with a ventilation air flow passage sectioned from both said treatment-object gas flow passage and said recycling gas flow passage.

4. A rotary gas treating apparatus, as defined in claim 3, wherein said ventilation air flow passage has its downstream end connected with said treatment-object gas flow passage on the upstream side of said front-stage rotor.

5. A rotary gas treating apparatus, as defined in claim 4, wherein between said desorbing areas of the two rotors, there is interposed an intermediate heater for heating the recycling gas which temperature has dropped by its passage through the upstream side desorbing area.

6. A rotary gas treating apparatus comprising:
    a plurality of rotors consisting essentially of adsorbing material and allowing gas flow along a rotational axis, said rotors having, within respective rotational areas thereof, adsorbing areas for introducing a treatment-object gas and desorbing areas for introducing a recycling gas;
    said adsorbing areas being disposed in order in a continuous treatment-object gas flow passage;
    said desorbing areas being disposed in recycling gas flow passages, respectively;
    said adsorbing material forming said rotors being fine activated carbon; and
    wherein said fine activated carbon forming a front-stage rotor positioned in said treatment-object gas flow passage has an average pore diameter greater than said fine activated carbon forming a rear-stage rotor positioned in said treatment-object gas flow passage.

7. A rotary gas treating apparatus, as defined in claim 6, wherein said recycling gas flow passages including said desorbing areas of the rotors are provided independently of each other.

8. A rotary gas treating apparatus, as defined in claim 7, wherein an intermediate heater for heating the recycling gas is provided on an upstream side of said desorbing area of the front-stage rotor.

9. A rotary gas treating apparatus comprising:
    a plurality of rotors consisting essentially of adsorbing material and allowing gas flow along a rotational axis, said rotors having, within respective rotational areas thereof, adsorbing areas for introducing a treatment-object gas and desorbing areas for introducing a recycling gas;
    said adsorbing areas being disposed in order in a continuous treatment-object gas flow passage;
    said desorbing areas being disposed in recycling gas flow passages, respectively;
    wherein the adsorbing material forming a frontstage rotor positioned in said treatment-object gas flow passage has an average pore diameter greater than the adsorbing material forming a rear-stage rotor;
    wherein said adsorbing material forming said rotors comprises fine activated carbon; and
    wherein said average pore diameter of the fine activated carbon forming said front-stage rotor is more than 1.1 times greater than the average pore diameter of the fine activated carbon forming said rear-stage rotor and said average pore diameter is not greater than 35 A.

10. A rotary gas treating apparatus, as defined in claim 9, wherein said average pore diameter of the fine activated carbon forming said front-stage rotor ranges approximately between 24A and 30A and said average pore diameter of the fine activated carbon forming said rear-stage rotor ranges approximately between 14A and 23A.

11. A rotary gas treating apparatus, as defined in claim 9, further comprising means for revolving said front-stage rotor and said rear-stage rotor wherein a revolving speed of said front-stage rotor is slower than a revolving speed of said rear-stage rotor.

12. A rotary gas treating apparatus, as defined in claim 11, wherein a ratio between said revolving speed of the front-stage rotor and said revolving speed of the rear-stage rotor ranges between 0.3 and 0.7.

13. A rotary gas treating apparatus, as defined in claim 11, wherein said front-stage rotor has a smaller thickness along said rotational axis than said rear-stage rotor.

14. A rotary gas treating apparatus, as defined in claim 13, wherein a ratio between said thickness of the front-stage rotor and that of said rear-stage rotor ranges between 0.3 and 0.7.

15. A rotary gas treating apparatus, as defined in claim 13, further comprising a heating means positioned between said desorbing area of said rear-stage rotor and said desorbing area of said front-stage rotor for heating said recycling gas wherein a temperature of recycling gas fed to said desorbing area of the front-stage rotor is set higher than a temperature of recycling gas fed to said desorbing area of the rear-stage rotor.

16. A rotary gas treating apparatus comprising:
a front-stage rotor and a rear-stage rotor each consisting essentially of an adsorbent material and allowing gas flow along a rotational axis, said rotors having, within respective rotational areas thereof, adsorbing areas for introducing a treatment-object gas and desorbing areas for introducing a recycling gas;
said adsorbing area of the front-stage rotor and said adsorbing area of the rear-stage rotor being disposed in order in a continuous treatment-object gas flow passage from an upstream side thereof;
said adsorbing material forming said rotors is fine activated carbon;
said desorbing area of the front-stage rotor and said desorbing area of said rear-stage rotor being disposed in recycling gas flow passages, respectively;
a drive mechanism for driving said front-stage and rear-stage rotors;
said drive mechanism drives said rotors at revolving speeds different from each other; and
an intermediate area provided in the rotational direction of said rear-stage rotor and between a terminal end of said desorbing area of the rear-stage rotor and a starting end of said adsorbing area of the rear-stage rotor, and a ventilation air flow passage provided such that the treatment-object gas having passed said intermediate area is returned to said treatment-object gas flow passage through said ventilation air flow passage.

17. A rotary gas treating apparatus, as defined in claim 16, wherein said drive mechanism includes a variable speed means for variably adjusting said revolving speeds of the front-stage and rear-stage rotors.

18. A rotary gas treating apparatus, as defined in claim 17, wherein said drive mechanism variable speed means includes rotary shafts for said front-stage and said rear-stage rotors, a motor and transmission mechanisms for transmitting rotational force of said motor to said rotary shafts, said transmission mechanisms having different transmission ratios.

19. A rotary gas treating apparatus, as defined in claim 18, wherein said adsorbing areas of said front-stage and rear-stage rotors are disposed in a substantially same region.

20. A rotary gas treating apparatus, as defined in claim 19, wherein the treatment-object gas is returned through said ventilation air flow passage to said treatment-object gas flow passage more upstream relative to said front-stage rotor.

21. A rotary gas treating apparatus, as defined in claim 20, wherein between said desorbing areas of the two rotors, there is interposed an intermediate heater for heating the recycling gas which temperature has dropped by its passage through the desorbing area of said rear-stage rotor.

22. A rotary gas treating apparatus, as defined in claim 21, wherein said adsorbing material forming said rotors comprises fibrous fine activated carbon.

* * * * *